(12) United States Patent
Baudasse

(10) Patent No.: US 8,446,655 B2
(45) Date of Patent: May 21, 2013

(54) ACTUATION SYSTEM FOR MOBILE ELEMENTS WITH DYNAMICALLY COMPENSATED AND OPPOSITE RELATIVE MOTIONS

(75) Inventor: Yannick Baudasse, Grasse (FR)

(73) Assignee: Thales, Neuilly sur Seine (FR)

( * ) Notice: Subject to any disclaimer, the term of this patent is extended or adjusted under 35 U.S.C. 154(b) by 358 days.

(21) Appl. No.: 13/024,350

(22) Filed: Feb. 10, 2011

(65) Prior Publication Data
US 2011/0198447 A1 Aug. 18, 2011

(30) Foreign Application Priority Data

Feb. 12, 2010 (FR) ...................................... 10 00585

(51) Int. Cl.
*G02B 26/08* (2006.01)
(52) U.S. Cl.
USPC .................. 359/200.8; 359/209.1; 359/221.2; 310/311
(58) Field of Classification Search
USPC ...................... 359/196.1–226.2; 310/300, 311
See application file for complete search history.

(56) References Cited

U.S. PATENT DOCUMENTS 4,355,870 A 10/1982 Lovelace et al.
2010/0229978 A1* 9/2010 Zhou ........................ 137/565.11

FOREIGN PATENT DOCUMENTS

| FR | 1059124 A | 3/1954 |
| FR | 1374397 A | 10/1964 |
| FR | 2622980 A1 | 5/1989 |
| FR | 2773890 A1 | 7/1999 |

\* cited by examiner

*Primary Examiner* — James Phan
(74) *Attorney, Agent, or Firm* — Baker Hostetler LLP

(57) ABSTRACT

An actuation system for at least two mobile elements with dynamically compensated and opposite relative motions, without disturbance of the elements fixed in the same rigid structure as it, and resistant to exterior loadings, in the case of a translational motion of the mobile elements, includes, in a rigid structure, at least one linear actuator linked to a motion transmission device with four rigid arms, articulated at their ends and forming a lozenge, of which each of two first opposite vertices is linked to a corresponding mobile element, and whose other two opposite vertices have a single translational degree of freedom.

11 Claims, 4 Drawing Sheets

ACTUATION SYSTEM FOR MOBILE ELEMENTS WITH DYNAMICALLY COMPENSATED AND OPPOSITE RELATIVE MOTIONS

CROSS-REFERENCE TO RELATED APPLICATION

This application claim priority to foreign French patent application No. FR 10 00585, filed on Feb. 12, 2010, the disclosure of which is incorporated by reference in its entirety.

FIELD OF THE INVENTION

The present invention pertains to an actuation system for at least two mobile elements with dynamically compensated and opposite relative motions, without disturbance of the environment and resistant to exterior loadings.

BACKGROUND OF THE INVENTION

One of the main applications of the actuation systems to which the present invention pertains relates to mechanisms of "Phase Modulation" type for optical instruments in space, intended to perform rotational or translational cycles of a "modulator plate" with position increments (four-phase modulation).

In an optical instrument, of interferometer type, this mechanism is situated between the splitter plate and one of the two stepped mirrors. The angle of "tilt" (case of rotation) or the linear displacement (case of translation) of the "modulator plate(s)" makes it possible to modify the length of an optical path.

In this type of mechanism, the technical problem resides mainly in several points:
  The loads and moments must be balanced and must remain internal to the mechanism, so as not to disturb the remainder of the instrument.
  In the case of several "modulator plates", their respective motions must be perfectly synchronized, while limiting the number of actuators (in the case of a single optical plate, a "counterweight" element is used).
  The assembly, when it is aboard a spacecraft, during the launch phase, must be "integral". This means that, despite the absence of any specific lashing system, it must not degrade under the effect of the accelerations generated by the launcher.

Shown diagrammatically in FIG. 1 is an autonomous and non-disturbing actuation system 1 for controlling opposite and synchronized rotational motions of two elements, an optical plate 11, and a counterweight frame 10 which are supported in rotation about a common axis "O" with the aid of a bearing comprising the flexible elements 12, 13 and which is similar to the bearing 34 represented in FIG. 5, the assembly forming part of an optical space instrument. This system essentially comprises: a support frame 9, two actuators 14a, 14b disposed so as to exert a couple between the elements 10 and 11, so as to orient them one with respect of an angle α. The actuators are of piezo-electric type. The element 10 comprises at its ends inertia pieces 10a, 10b intended to limit the mass of the assembly. The limits of the path of the optical beam received by the device 1 have been delimited by two dashed lines T1, T2.

The system represented in FIG. 2, of the type with linear motions, comprises: a carrier rigid structure 9 supporting two compensating prismatic optical plates 10 and 11 by way of identical flexible metallic guidance platelets 12a, 13a, these two compensating prismatic optical plates 10 and 11 being propelled by two specific actuators 14a and 14b. A plate 13a is represented in the magnified detail view in the right part of FIG. 2.

During the operation of a linear mechanism of this type, in order to limit the forces tending to disturb the instrument, each setting of an element into motion must be compensated by an equivalent load in the opposite direction and along an axis passing through the centres of gravity of the elements in motion. The same holds for rotary mechanisms where the centres of gravity of the elements in motion must preferably be situated on a single axis of rotation.

The system presented in FIG. 1 proposes a specific actuator for motorizing each element, thereby multiplying the number of components. Synchronization of the motions is obtained by complex electronic circuits. The non-convergence of the thrust vectors of the actuators and the desynchronization of the motions generate dispersions towards the instrument.

The linear system presented in FIG. 2 also proposes a specific actuator for motorizing each of the two elements. The non-convergence of the two thrust vectors of the actuators and the electronic synchronization of the motions generate dispersions towards the instrument.

SUMMARY OF THE INVENTION

The subject of the present invention is an actuation system for at least two mobile elements with dynamically compensated and opposite relative motions, without disturbance of the elements fixed in the same rigid structure as it, and resistant to exterior loadings. Such a system must be compact and free of play, it must afford "automatic" synchronization of the motion of these mobile elements (without needing any additional synchronization mechanism) by being self-lashed (without needing any specific lashing mechanism), and very precise (precision such as required for optical instruments) and having a long lifetime (for example more than 15 years).

The first embodiment of the actuation system in accordance with the invention is an actuation system for at least two mobile elements with relative translational motions, and it is characterized in that it comprises, in a rigid structure, at least one linear actuator linked to a motion transmission device with four rigid arms, articulated at their ends and forming a lozenge of which each of two first opposite vertices is linked to a corresponding mobile element and whose other two opposite vertices have a single translational degree of freedom and are linked to the actuator, each of the two mobile elements being linked solely to one of the said first vertices.

When there are 2n mobile elements (n>1), the latter are considered pairwise.

The second embodiment of the actuation system in accordance with the invention is an actuation system for at least two mobile elements with dynamically compensated and opposite relative rotational motions, and it is characterized in that it comprises, in a rigid structure, at least one linear actuator linked to a motion transmission device with four rigid arms, articulated at their ends and forming a lozenge, each arm of each pair of opposite arms being linked on one side to a mobile element and on the other side to a mobile element, the two opposite vertices of the lozenge comprising the link to the actuator(s) having a single translational degree of freedom, and it is characterized in that the mobile elements are each articulated to at least one bearing.

When there are 2n mobile elements (n>1), the latter are considered pairwise.

Thus, the system of the invention uses a combination of articulated levers making it possible to obtain, on the basis of a linear input motion, two perfectly synchronized alternate motions in opposite directions (in rotation or in translation). The devising of these levers is such that it makes it possible to eliminate the forces or couples exported from the mechanism to the elements fixed in the same rigid structure as it (elements which go to make up an optical bench, when the application of this system relates to optical instruments). The triangulation of these levers is such that it also makes it possible to convey the vibratory loads of the launch to the actuators which initiate the motion and thus to avoid the use of a specific lashing mechanism.

BRIEF DESCRIPTION OF THE DRAWINGS

The present invention will be better understood on reading the detailed description of an embodiment, taken by way of nonlimiting example and illustrated by the appended drawing in which.

DETAILED DESCRIPTION

The present invention is described hereinbelow with reference to optical instruments for spacecraft, but of course it is not limited to this application alone, and may be implemented in various applications, onboard or otherwise, in which it is necessary to impress precise translational or rotational motions, oscillatory or otherwise (these motions being synchronized, that is to say symmetric with respect to a nominal or rest position of relatively low amplitude, for example of a few tenths of a millimeter or degree) on mobile elements without disturbing their support devices, these elements being, if appropriate, protected from the abrupt accelerations that their supports might undergo.

Figure 3:
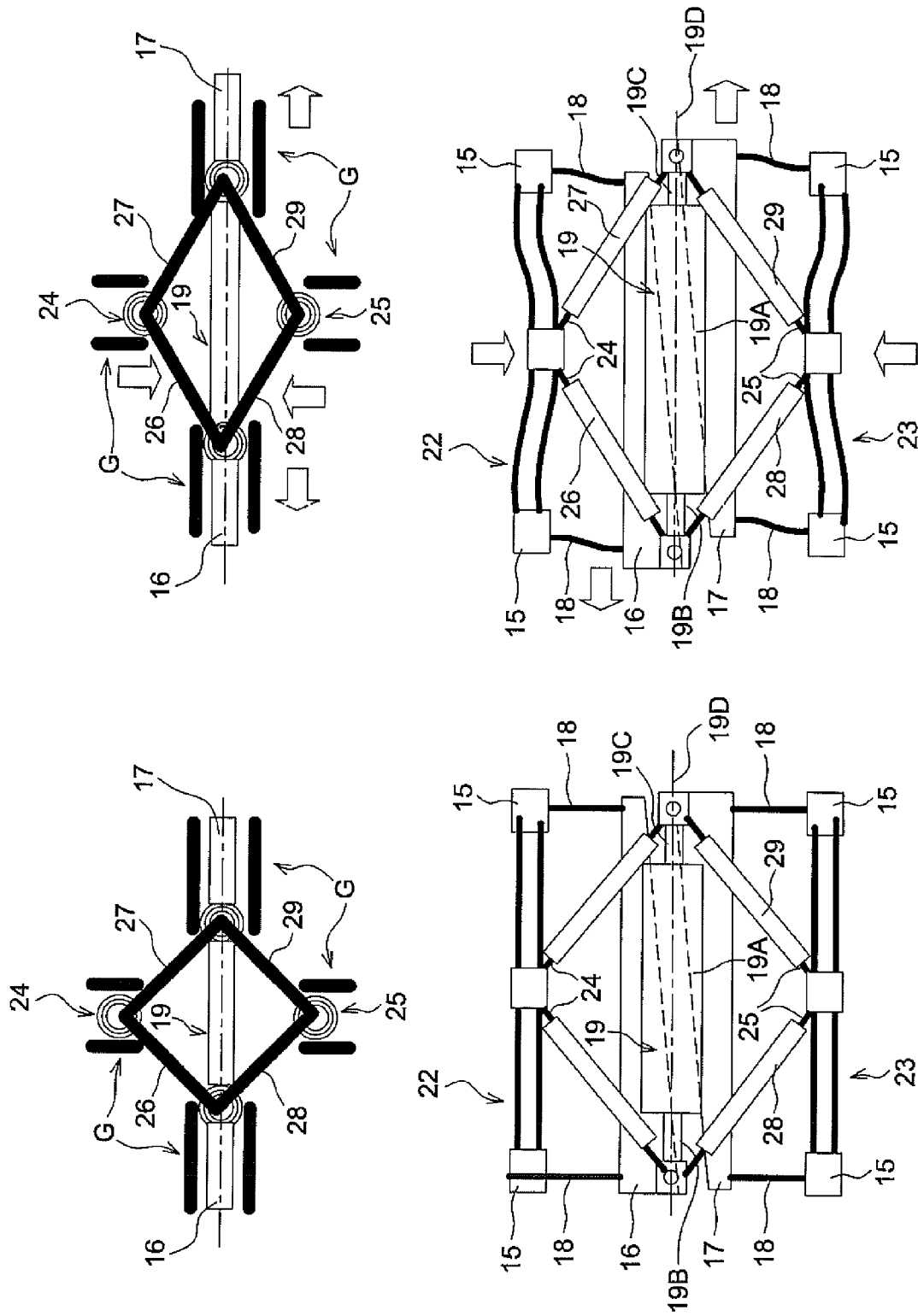
FIGS. 3 to 7 are simplified diagrams, equivalent functional diagrams, viewed from above, and detail views of actuation devices in accordance with the invention.

Shown diagrammatically in FIG. 3 is an exemplary embodiment of the device of the invention for two different states: in the left part of the figure, this device is represented in the "rest" state, and in the right part of the figure, it is in the activated state of the actuator. Represented at the bottom in each of these two parts, left and right, of FIG. 3, is an exemplary device embodiment and at the top its equivalent functional diagram.

Figure 1:
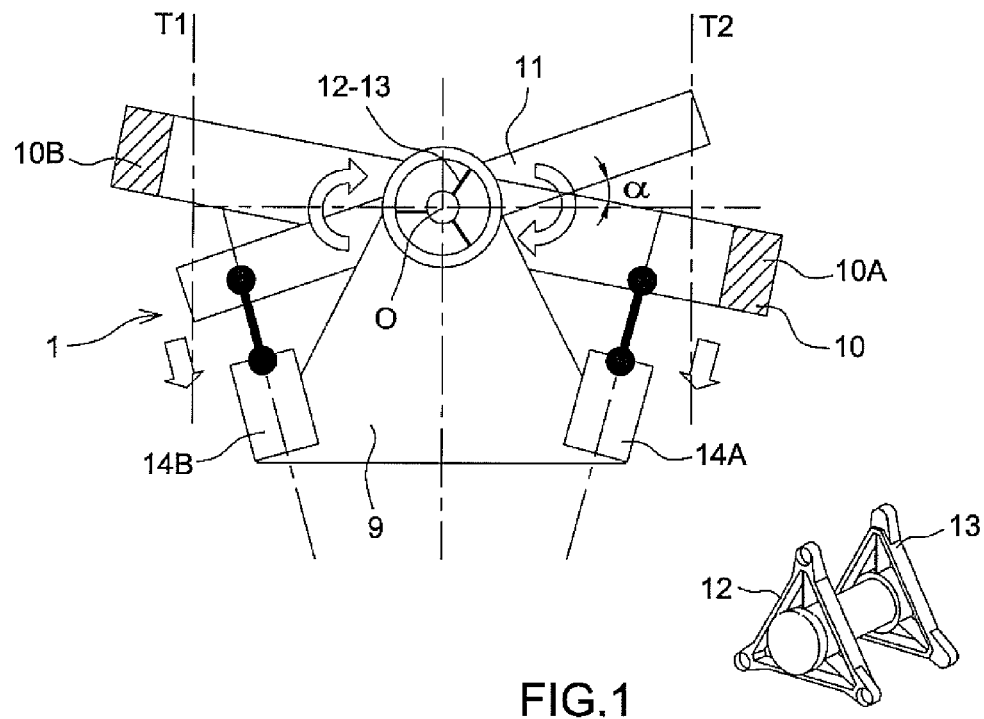
FIGS. 1 and 2, already described hereinabove, are simplified diagrams of prior art actuation devices.
Figure 2:
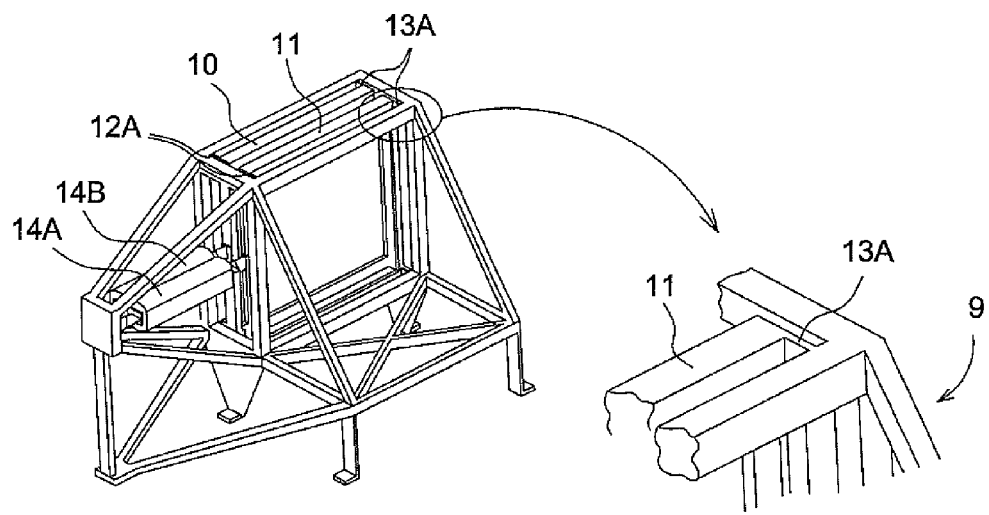

The device of the invention is supported by a rigid structure, which is here a framework similar to that represented in FIG. 2. Of this framework, only the uprights 15 which vertically bracket (perpendicularly to the plane of the drawing) the optical plates 16, 17, have been shown diagrammatically. The uprights 15 of the framework support the two substantially mutually parallel optical plates 16, 17, by way of flexible metallic platelets 18 allowing the optical plates translational motions parallel to their own plane. It will be noted that because these platelets 18 deform by rotating slightly, the distance between their ends decreases slightly, therefore the distance between the plates 16, 17 and the axis 19D also varies slightly. However, this variation does not have any harmful effect because it is sought to vary the path of the optical beam by making it pass through a different plate thickness, in fact the sum of the thicknesses of the two optical plates. However, if this were to pose a problem, opposed mechanical plates would be used (as is the case for the transverse guidance with the two flexible plates 22 and 24), or else compensated guidance plates of known type.

The motions of the optical plates are controlled by a linear actuator 19, for example of the piezo-electric type with cylindrical body. From each end of the body 19A of this actuator there projects an actuation arm, 19B, 19C respectively, these arms being coaxial with the axis 19D of the cylindrical body. The platelets 18 are, in the rest state, perpendicular to the axis 19D of the body of the actuator 19. The ends of the arms 19B, 19C of the actuator 19 are each linked, in a fixed or articulated manner (pivots 20, 21), respectively to each optical plate 16, 17: the end of the arm 19B is linked to the plate 16, while the end of the arm 19C is linked to the plate 17. Thus, this actuator is mounted floating between the two mobile optical plates.

Ties 22, 23 exhibiting "transverse flexibility" are fixed, parallel to the axis 19D, between the uprights 15 of the framework taken pairwise on either side of the axis 19D. This transverse flexibility signifies here that the middle of each of these ties exhibits a single translational degree of freedom in a direction perpendicular to the axis 19D. According to the embodiment represented, each of these ties is parallel, in the rest state, to the axis 19D and consists for example of two mutually parallel flexible metallic platelets disposed a small distance apart (a few millimetres, for example, however, the bigger the distance, the better the guidance will be). However, of course these ties may be realized differently, on condition that the said "transverse flexibility" is adhered to.

A pivot 24, 25 is fixed respectively in the middle of the length of each of the ties 22, 23. Identical rigid rods 26, 27, 28 and 29 respectively link the pairs of pivots 20-24, 24-21, 21-25 and 25-20, and thus form the sides of a regular lozenge. Given that, as specified hereinabove, the platelets 18 are realized in such a way as to allow the plates to support only translational motions parallel to the axis 19D, the pivots 20 and 21 can only move along the axis 19D.

The views of FIG. 3 being views from above, it is of course understood that only the elements 18 and 20 to 29 fixed at the upper part of the plates 16 and 17 have been represented, and that elements identical to the elements 18 and 20 to 29 are advantageously disposed at the lower part of the plates 16 and 17.

As a variant, the device described hereinabove may be composed of a single specific synchronization system if the mass to be set into motion can be symmetrized about the actuator.

The motions permitted to the pivots 20, 24, 21 and 25 are translational motions with a single degree of freedom (neglecting the slight variation in distance between the optical plates and the axis 19D, as noted hereinabove), this being symbolized in the top part of FIG. 3 by "glideways" G in which the corresponding pivots move. Thus, when the actuator 19 is controlled in such a way as to make its arms 19B, 19C extend out from the body 19A, the centres of the pivots 20 and 21 move apart, substantially along the axis 19D, driving the plates 16 and 17 in opposite directions in a synchronous manner (of course, it is assumed here that the opposite motions of the arms of the actuator are mutually synchronous). The lozenge formed by the rods 26 to 29 flattens (right part of FIG. 3), that is to say the pivots 24 and 25 approach one another, and their centres move on the perpendicular bisector of the straight segment delimited by the centres of the pivots 20 and 21. It follows from this that the platelets of the ties 22 and 23 curve towards the axis 19D and that the pivots 24 and 25 move along a straight line perpendicular to the axis 19D, and therefore have a translational motion with a single degree of freedom.

Because the motions of the plates 16 and 17 are "controlled" by the deformations of the lozenge formed by the rigid rods 26 to 29, any acceleration undergone by the whole of the system of the invention does not modify the relative positions of these two plates (if, of course, the arms of the actuator 19 are locked in their position). Conversely, the motions of the two optical plates are not transmitted to the framework, and therefore to the other instruments secured to this framework because these motions balance each other by virtue of the same lozenge.

Figure 4:
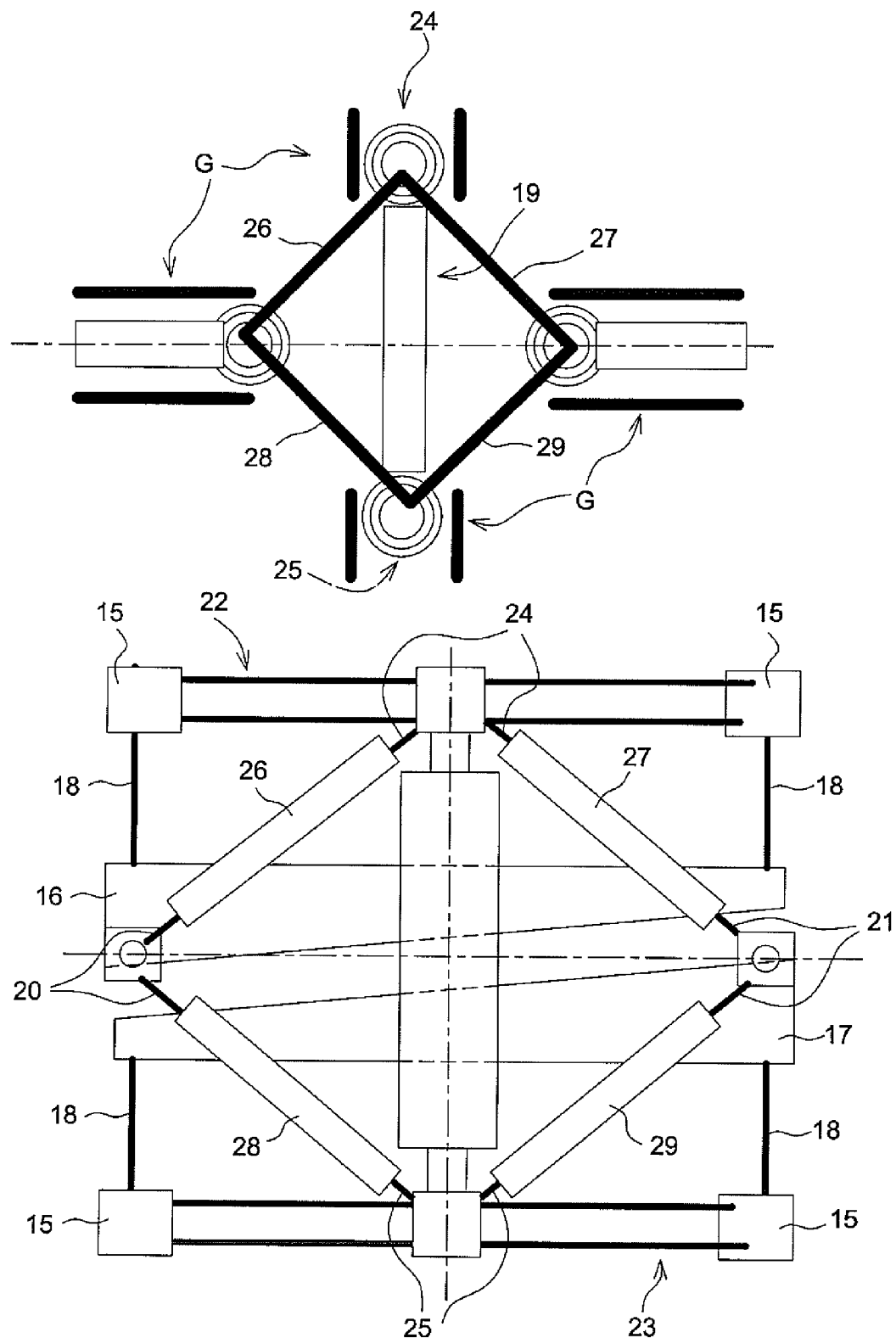

Shown diagrammatically in FIG. 4 is a variant of the system of FIG. 3. In this FIG. 4, the elements similar to those of FIG. 3 are assigned the same numerical references. The essential difference between these two systems is that the actuator 19 is mounted between the pivots 24 and 25 (these pivots 24 and 25, as well as the pivots 20 and 21 are modified accordingly, if necessary). Because in this embodiment of FIG. 4 the same fixings by platelets 18 of the optical plates 16, 17 and the same lozenge formed by the rigid rods 26 to 29 are retained, the advantages cited hereinabove of the system of FIG. 3 are retained.

Figure 5:
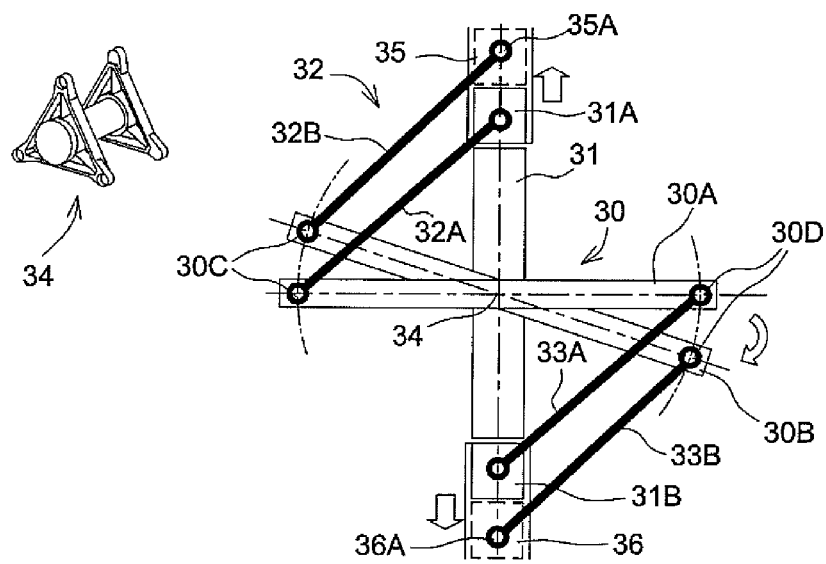
Figure 6:
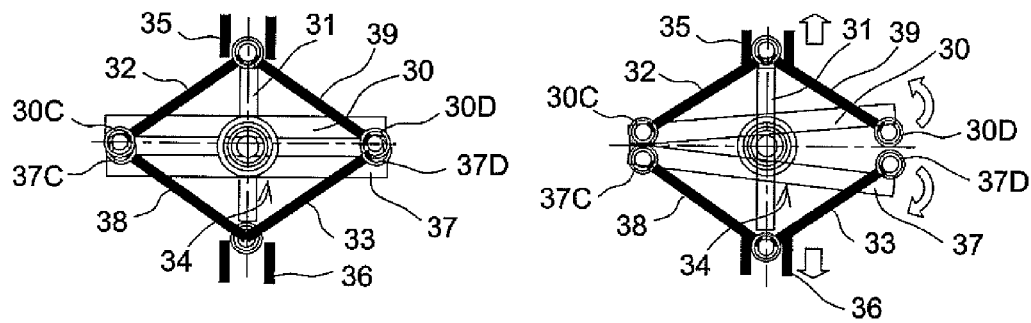

In FIGS. 5 and 6 has been represented the system of the invention in the case where it is necessary to impress a rotational motion on optical plates. This system is supported by a structure (not represented) which is advantageously similar to that shown diagrammatically in FIGS. 3 and 4.

FIG. 5 illustrates the principle of the rotational motion through a simplified diagram showing a single plate in two different positions, as well as a perspective detail view of a guide bearing that may be used in the system of the invention, while FIG. 6 represents the equivalent functional diagrams of the system of the invention with two optical plates in two different positions, and a partial schematic view of a detail of this system.

To simplify the drawing, only a single optical plate 30 is represented in FIG. 5, in two different positions: position 30A is the "rest" position (actuator not activated), and position 30B is the position of this same plate after a rotation of a few degrees clockwise impressed by the actuator 31. The actuator 31, which may be the same as the actuator 19, as illustrated by the drawing, is represented solely in the rest position, for which its two arms 31A, 31B are retracted to the maximum. The ends of the arms 31A, 31B each comprise a pivot (35A, 36A respectively) linked by a rigid rod 32, 33 respectively, to a pivot (30C, 30D, respectively) fixed to a corresponding end of the "horizontal" upright of the frame of the optical plate 30. These rods are also represented for the two positions of the plate 30: positions 32A, 33A for the rest position and positions 32B, 33B after the said rotation. The bearing 34 supporting the rotation of the plates of the system of the invention may be advantageously such as that represented in the detail view of FIG. 5. This bearing has been described in French patent application No. 07 53521 filed on Feb. 27, 2007, and will therefore not be described here. The ends of the arms 31A, 31B are guided so as to have only a single translational degree of freedom (along a straight line coincident with the longitudinal axis of the actuator 31), this being symbolized in FIGS. 5 and 6 by "glideways" 35 and 36.

The complete system with two rotary optical plates or a plate and a counterweight element has been shown diagrammatically in FIG. 6, the left view corresponding to the "rest" position of the two mobile elements (substantially mutually parallel elements), and the right view corresponding to a position after a small rotation of the two plates in contrary directions. This system comprises, in addition to the optical plate 30, a second optical plate 37, these two plates each being articulated on a bearing such as the bearing 34. Each optical plate is actuated by the actuator 31 by way of rigid rods 38, 39 in the same manner in which the plate 30 is actuated. The rods 32, 33, 38 and 39 are disposed so as to form the sides of a regular lozenge. The elements fulfilling the function of the glideways 35 and 36 are elements similar to the ties 22 and 23 of FIGS. 3 and 4.

Figure 7:
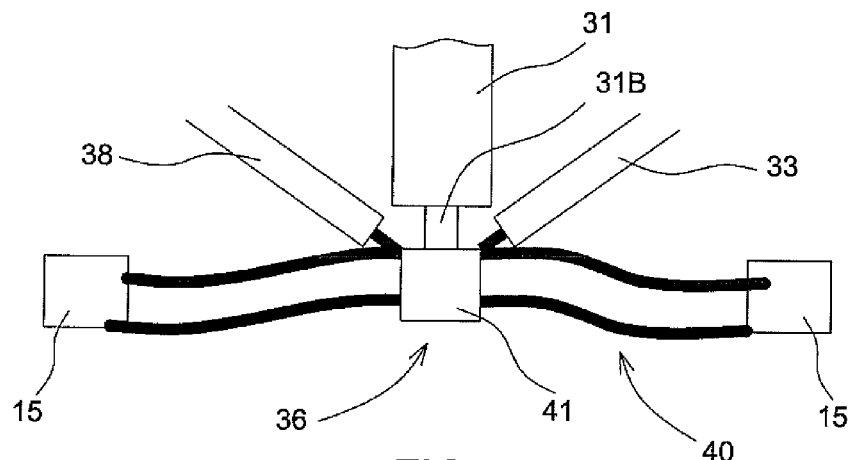

The details of the device affording the function of the glideway 36 have been represented in the partial detail view of FIG. 7. This device comprises a flexible tie 40 consisting, like the tie 23, of two flexible metallic platelets in the middle of the length of which has been fixed a pivot 41 which is linked to the end of the arm 31B of the actuator. One of the ends of each of the rods 33 and 38 is articulated on a pivot 41. The platelets of the tie 40 are, for example, as represented in FIG. 7, curved towards the optical plates when the arms of the actuator 31 are retracted, and rectilinear (or curved in the contrary direction) when these arms are extended out from the body of the actuator to the maximum. The other elements of this system of FIGS. 5 and 6 (framework, pivots, "glideways" relating to the arms of the actuator) may be the same as those of the system of FIG. 3.

The invention claimed is:

1. An actuation system for at least two mobile elements with dynamically compensated and opposite relative translational motions, said system comprising, in a rigid structure, at least one linear actuator linked to a motion transmission device with four rigid arms, said rigid arms articulated at ends thereof and forming a lozenge, each of two first opposite vertices of the lozenge being linked to a corresponding mobile element and each of another two opposite vertices of the lozenge having a single translational degree of freedom and being linked to the actuator, wherein each of the two mobile elements are linked solely to one of the first vertices.

2. The system according of claim 1, wherein the mobile elements are mounted on the rigid structure by way of flexible plates.

3. The system according to claim 1, wherein the actuator is a piezo-electric actuator.

4. The system according to claim 2, wherein the mobile elements are optical plates and that it is mounted aboard a spacecraft.

5. The system according to claim 2, wherein the actuator is a piezo-electric actuator.

6. The system according to claim 3, wherein the mobile elements are optical plates and that it is mounted aboard a spacecraft.

7. The system according to claim 1, wherein the mobile elements are optical plates and that it is mounted aboard a spacecraft.

8. An actuation system for two mobile elements with dynamically compensated and opposite relative rotational motions, said system comprising, in a rigid structure, at least one linear actuator linked to a motion transmission device with four rigid arms, articulated at their ends and forming a lozenge, each arm of each pair of opposite arms being linked on one side to a mobile element and on the other side to another mobile element, two opposite vertices of the lozenge comprising the link to the actuator having a single translational degree of freedom, wherein the mobile elements are each articulated to at least one bearing.

9. The system according to claim 8, wherein the actuator is a piezo-electric actuator.

10. The system according to claim 9, mounted aboard a spacecraft, and wherein the mobile elements are optical plates.

11. The system according to claim 8, mounted aboard a spacecraft, and wherein the mobile elements are optical plates.

* * * * *